United States Patent
Mok

[11] Patent Number: 5,942,868
[45] Date of Patent: Aug. 24, 1999

[54] SPEED AND PHASE CONTROLLER FOR MOTOR AND VIDEO CASSETTE RECORDER HAVING SAME

[75] Inventor: Dong Kyun Mok, Kyungki-do, Rep. of Korea

[73] Assignee: LG Electronics, Inc., Seoul, Rep. of Korea

[21] Appl. No.: 08/566,285

[22] Filed: Dec. 1, 1995

[30] Foreign Application Priority Data

Dec. 2, 1994 [KR] Rep. of Korea ................ 94-32515
Feb. 2, 1995 [KR] Rep. of Korea ................ 95-1848

[51] Int. Cl.⁶ .............................................. G05B 13/00
[52] U.S. Cl. ..................... 318/561; 318/615; 318/619; 318/638
[58] Field of Search ................... 318/560, 561, 318/566, 568.17, 568.18, 568.22, 595, 608, 606, 607, 615–617, 619, 268, 254, 439, 138, 503, 807, 810, 811, 599, 638, 646; 388/804, 805, 811, 812, 930

[56] References Cited

U.S. PATENT DOCUMENTS

| | | |
|---|---|---|
| 4,501,343 | 2/1985 | Salihi ............................ 318/803 X |
| 4,617,635 | 10/1986 | Shimizu ............................ 364/474.12 |
| 4,651,067 | 3/1987 | Ito et al. ............................ 318/254 |
| 4,839,573 | 6/1989 | Wise ............................ 318/615 |
| 4,843,292 | 6/1989 | Ono et al. ............................ 318/606 |
| 4,902,949 | 2/1990 | Hirata ............................ 318/608 |
| 5,001,407 | 3/1991 | Suzuki et al. ............................ 318/268 |
| 5,298,841 | 3/1994 | Katayama et al. ............................ 318/268 |
| 5,391,969 | 2/1995 | Tabuchi ............................ 318/611 |
| 5,436,545 | 7/1995 | Bahr et al. ............................ 318/727 |
| 5,475,291 | 12/1995 | Yoshida et al. ............................ 318/568.22 |
| 5,548,679 | 8/1996 | Kiyota ............................ 388/811 |

*Primary Examiner*—Brian Sircus
*Attorney, Agent, or Firm*—Morgan, Lewis & Bockius LLP

[57] ABSTRACT

A speed and phase controller for a motor includes detecting and servo system for detecting a speed and a phase of the motor and for outputting a speed and phase control signal corresponding to the detected speed and phase of the motor, load detector for detecting a load on the motor and for outputting a determination value corresponding to the detected load on the motor, gain controller for variable-amplifying the speed and phase control signal of the detector and servo system according to the determination value of the load detector, motor driving controller for outputting a driving control signal according to the variable-amplified speed and phase control signal, and a motor driver for driving the motor according to the driving control signal of the motor driving controller.

14 Claims, 11 Drawing Sheets

AFT sampling point — HS

— ON

— F̄/R

— VS

|← t1 →|← t2 →|

FIG.8
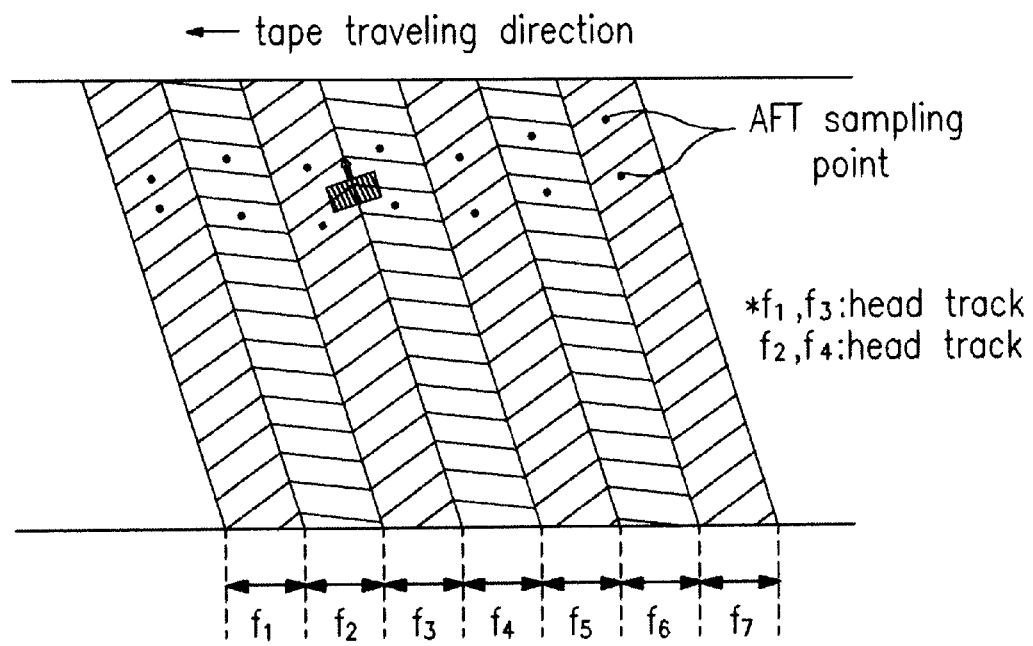
FIG.9a
FIG.9b
FIG.9c
FIG.9d
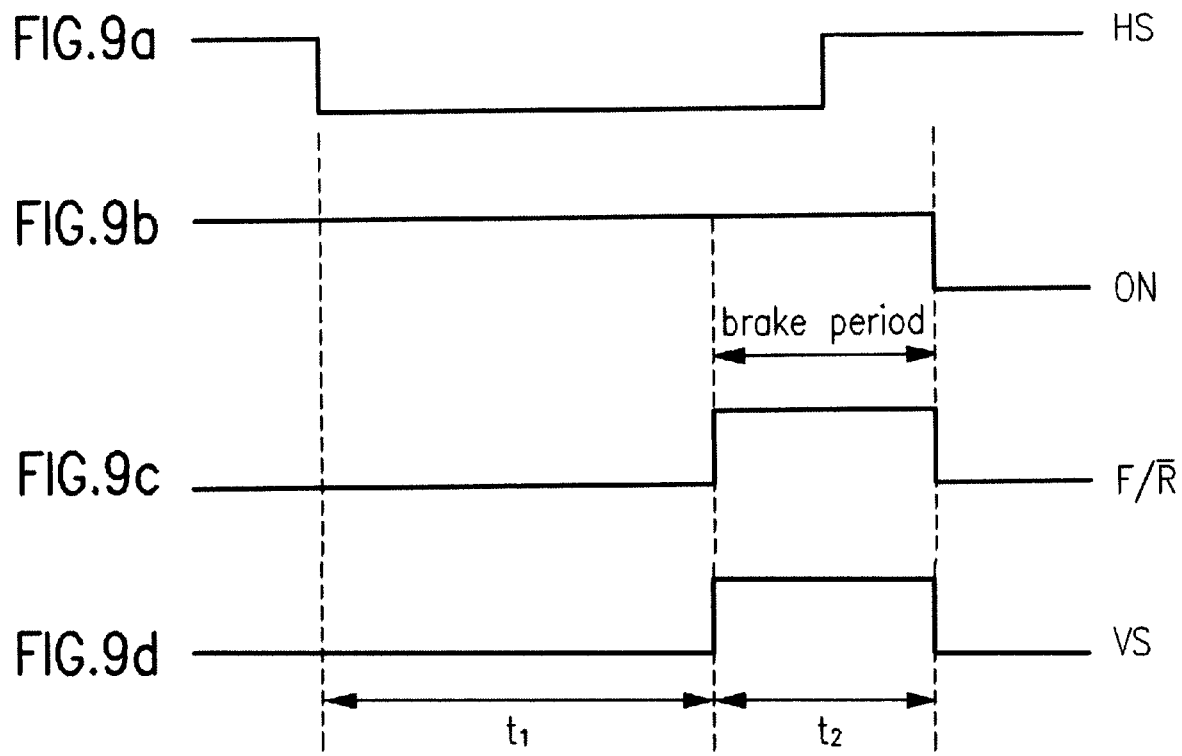

SPEED AND PHASE CONTROLLER FOR MOTOR AND VIDEO CASSETTE RECORDER HAVING SAME

BACKGROUND OF THE INVENTION

1. Field of the Invention

The present invention relates to a speed and phase controller for a motor, and more particularly, to a motor speed and phase controller for a video cassette recorder (VCR).

2. Discussion of the Related Art

The operation of a conventional motor speed and phase controller will now be described in detail with reference to FIGS. 1 and 2.

FIG. 1 is a schematic diagram of a conventional motor controller in a general VCR, which includes a speed detector 1 and a phase detector 2 for respectively detecting speed and phase of a rotating motor M, a speed servo 3 and a phase servo 4 for respectively comparing the speed and the phase respectively detected by speed detector 1 and phase detector 2 and each outputting a signal corresponding to a difference between the detected value and a target value, a speed gain controller 5 and a phase gain controller 6 for processing the signals output from speed servo 3 and phase servo 4 by a gain fixed during the designing process, a motor driving controller 7 for receiving output signals of speed gain controller 5 and phase gain controller 6 and controlling the same by a final gain value to output a pulse-width modulated (PWM) signal and outputting a motor-on signal (ON) and a forward/reverse determination signal (F/R), a lowpass filter (LPF) 8 for converting the PWM signal output from motor driving controller 7 into a DC signal, a DC/DC converter 9 for converting the signal output from LPF 8 into an actual motor driving power supply ($V_s$), and a driver 10 for driving motor M in a playback mode by the signal output from DC/DC converter 9, for receiving a stand-by signal, i.e., the motor-on signal (ON) and forward/reverse determination signal (F/R) and for driving motor M in a still picture mode. Here, speed servo 3 and phase servo 4, speed gain controller 5 and phase gain controller 6, and motor driving controller 7 are software operated, and LPF 8, DC/DC converter 9 and driver 10 are hardwired.

The operation of the conventional motor controller having the aforementioned configuration will now be described.

In the case of playback operation, the speed and phase are detected by speed detector 1 and phase detector 2, respectively to control motor M to be suitable for the playback mode to reach a target speed and a target phase. The detected speed and phase are compared with the target speed and target phase in speed servo 3 and phase servo 4 which output error signals corresponding to the difference between detected and target values.

The output error signal is processed by a gain control value set by speed gain controller 5 and phase gain controller 6 determined by the design and is added to speed and phase signal to then be input to motor driving controller 7.

Then, motor driving controller 7 gain-controls the signal to be suitable for the playback mode once again to then output a final control signal, i.e, the PWM signal with a changed on-time period. The output PWM signal is converted into a DC signal in LPF 8 and converted into an actual motor driving power supply in DC/DC converter 9 for application to driver 10, thereby controlling motor M.

In the case of a still picture implementation, if a picture is input during the playback mode, the speed and phase are detected by speed detector 1 and phase detector 2, respectively to control motor M driven at a target speed and phase during the current playback mode in accordance with the still picture mode. The detected speed and phase are compared with the target speed and target phase in speed servo 3 and phase servo 4 to output an error signal corresponding to the difference between the detected and target values.

The output error signal is processed by a gain control value set by speed gain controller 5 and phase gain controller 6 and is added to the speed and phase signals to then be input to motor driving controller 7.

Then, motor driving controller 7 outputs a still picture mode stand-by signal, i.e., the motor-on signal (ON) and forward/reverse determination signal (F/R) to driver 10 in order to stop motor M driven by the PWM signal being generated in the current playback mode, thereby controlling motor M.

The process of controlling the still picture will be described with reference to FIGS. 2a to 2d.

As shown in FIG. 2a, if a still picture signal is input during a playback mode, motor driving controller 7 detects the playback phase inclined forward and backward when a video head traces a video track of a tape to stop the driving of motor M to then determine time $t_1$. Then, in a time $t_1$ from a head switching time, controlling is performed for a predetermined motor brake period $t_2$ using the forward/reverse rotation determining signal (F/R) of motor M (FIG. 2c) and the motor driving power supply ($V_s$) which is a motor control signal (FIG. 2d).

Here, the control time $t_1$ at stop is increased if the current video head VH lags the tape video track, and is decreased if the current video head VH leads the tape video track, thereby implementing a still picture.

However, the conventional technologies consider only the speed and phase relationship between the current video head and tape video track to realize the motor speed and phase control in order to control a motor. Actual usage conditions (i.e., tape difference according to time, tape difference according to its initial, middle, and terminal periods, tape travelling load difference according to mechanism, and load changes applied to the mechanism and tape) are not considered. Therefore, when a user selects a still picture mode or a playback mode, the motor is only sensitive to surrounding conditions and is not optimally controlled according to the load on the motor. Consequently, a high definition picture is not obtained.

SUMMARY OF THE INVENTION

Accordingly, the present invention is directed to a speed and phase controller for a motor that substantially obviates one or more of the problems due to limitations and disadvantages of the related art.

An object of the present invention is to provide a speed and phase controller for a motor which is suitable for controlling disturbance applied to the motor by detecting tape difference according to time, tape difference according to its initial, middle, and terminal periods, tape travelling load difference according to the mechanism, and load changes applied to the mechanism and tape.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the speed and phase controller for a motor includes detecting and servo means for detecting a speed and a phase of the motor and for outputting a speed and phase control signal corresponding to the detected speed and phase of the motor, load detecting means for detecting a load on the motor and for outputting a determination value corresponding to the detected load on the motor, gain controlling means for variable-amplifying the speed and phase control signal of the detecting and servo means according to the determination value of the load detecting means, motor driving controlling means for outputting a driving control signal according to the variable-amplified speed and phase control signal, and a motor driving means for driving the motor according to the driving control signal of the motor driving controlling means.

In another aspect, the speed and phase controller for a motor includes detecting and servo means for detecting a speed and a phase of the motor and for outputting a speed and phase control signal corresponding to the detected speed and phase of the motor, gain controlling means for amplifying the speed and phase control signal of the detecting and servo means, load detecting means for detecting a load on the motor and for outputting a determination value corresponding to the detected load on the motor, motor driving controlling means for variable-outputting a driving control signal according to the determination value of the load detecting means, and a motor driving means for driving the motor according to the driving control signal of the motor driving controlling means.

In a further aspect, the video cassette recorder includes a motor, and a speed and phase controller having a detector and servo for detecting a speed and a phase of the motor and for outputting a speed/phase control signal corresponding to the detected speed and phase of the motor, a load detector for detecting a load on the motor and for outputting a determination value corresponding to the detected load on the motor, and a motor regulator for driving the motor according to the determination value and the speed/phase control signal.

To further achieve these and other advantages and in accordance with the purpose of the present invention, as embodied and broadly described, the motor speed and phase controller includes detecting and servo means for detecting speed and phase of a motor and outputting the corresponding speed and phase control signal, load detecting means for detecting load amount of the motor and outputting the corresponding determination value, gain controlling means for variable-amplifying the speed and phase control signal of the detecting and servo means according to the determination value of the load detecting means, motor driving controlling means for outputting a driving control signal of the motor according to the variable-amplified signal of the gain controlling means, and a motor driving means for driving the motor according to the driving control signal of the motor driving controlling means.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 8 illustrates the phase detection value calculation for the load during a still picture mode according to the present invention;

FIGS. 9a to 9d are motor controlling timing charts during a still picture mode adopted in FIG. 3;

DETAILED DESCRIPTION OF THE PREFERRED EMBODIMENTS

Reference will now be made in detail to the preferred embodiments of the present invention, examples of which are illustrated in the accompanying drawings.

Figure 1:
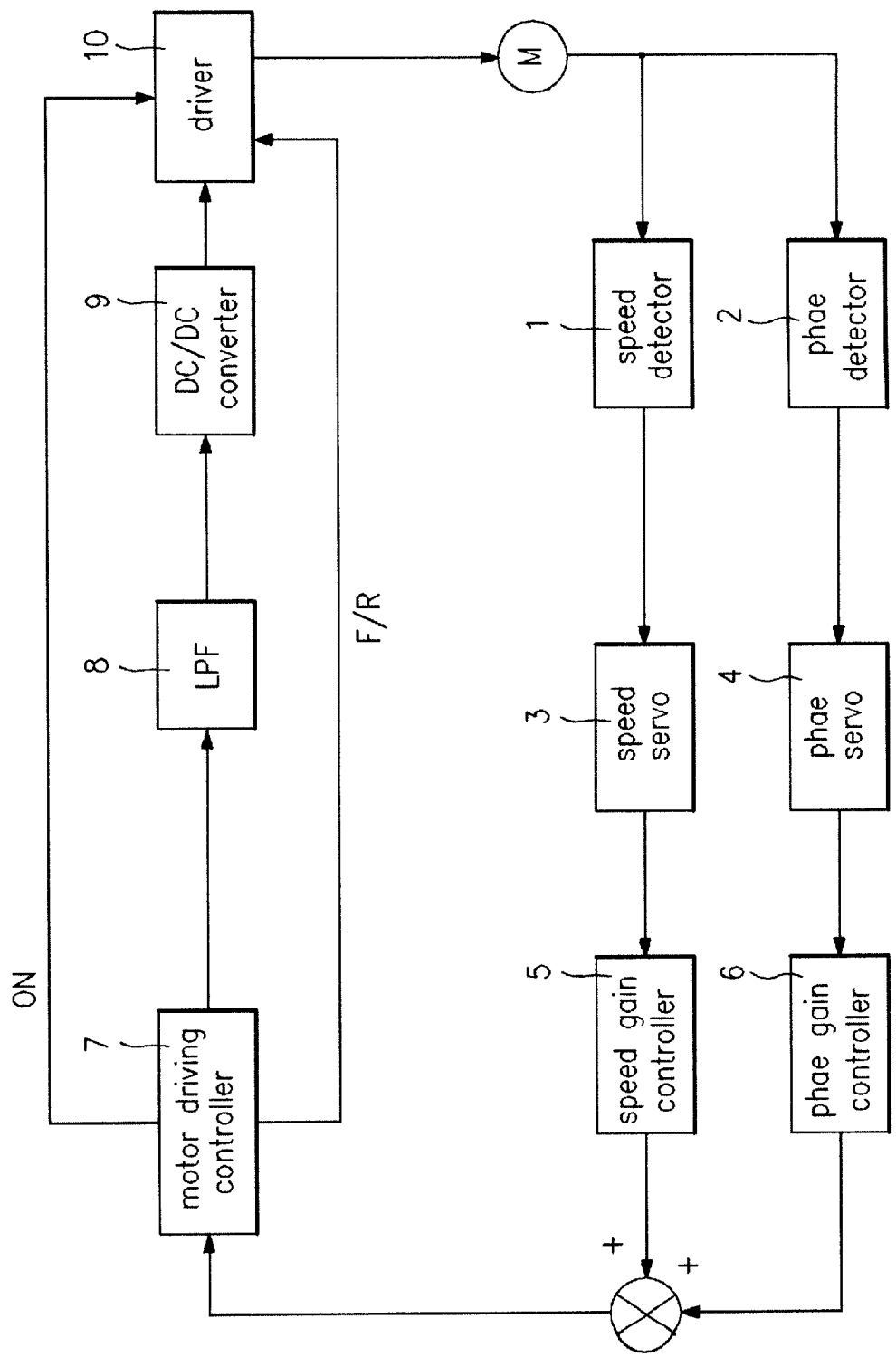
FIG. 1 is a block diagram of a conventional motor controller.
Figure 2A:
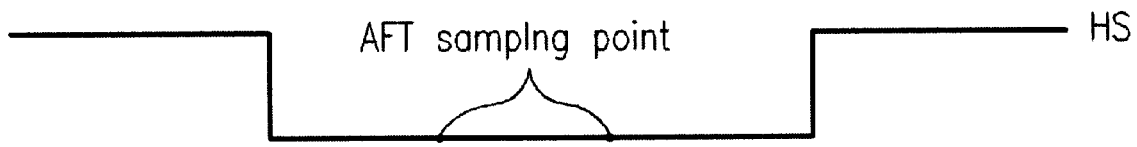
FIGS. 2a to 2d are motor controlling timing charts during a still picture mode of a conventional motor controller.
Figure 2B:
Figure 2C:
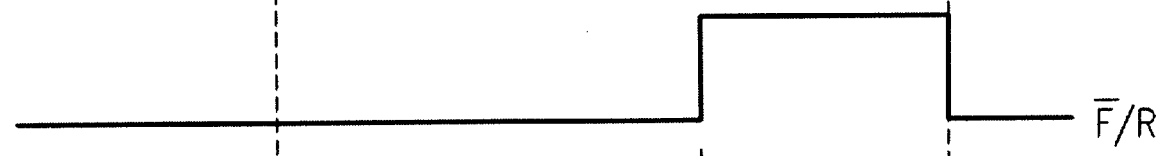
Figure 2D:
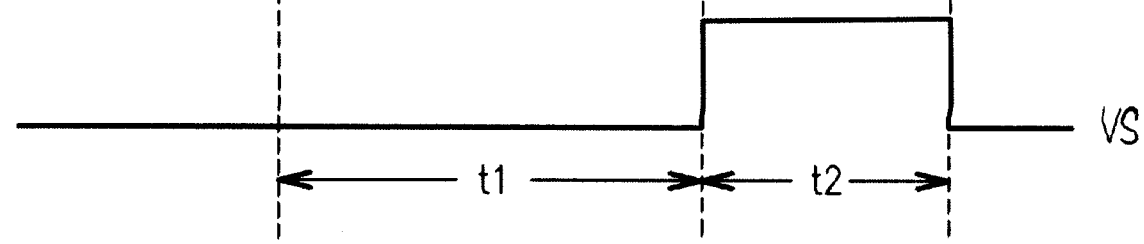
Figure 3:
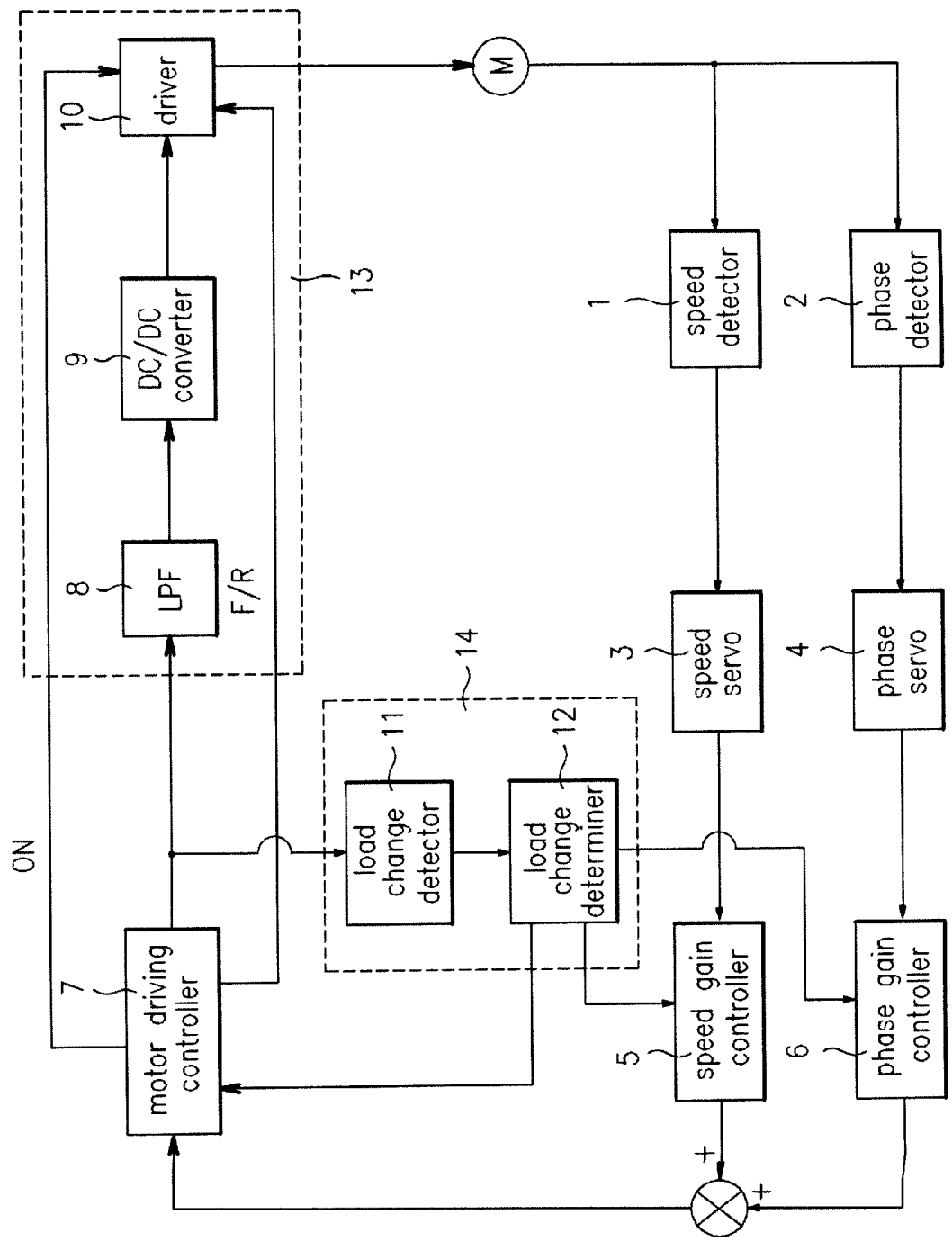
FIG. 3 is a block diagram of a motor speed and phase controller according to an embodiment of the present invention.

As shown in FIG. 3, the motor speed and phase controller according to the present invention includes a speed detector 1 and a phase detector 2 for respectively detecting the speed and phase of a rotating motor M, a speed servo 3 and a phase servo 4 for respectively comparing the speed and the phase respectively detected by speed detector 1 and phase detector 2 and each outputting a signal corresponding to the difference between the detected values and the target values, a load detector 14 for detecting load changes of a motor M and for outputting a gain value corresponding to the detected load change, a speed gain controller 5 and a phase gain controller 6 for processing the signal output from speed servo 3 and phase servo 4 by a gain value fixed in the design of the unit, a motor driving controller 7 for receiving output signals of speed gain controller 5 and phase gain controller 6 and for controlling the speed and phase by a final gain value by outputting a pulse-width modulated (PWM) signal, a motor-on signal (ON) and a forward/reverse determination signal (F/W), and a motor driver 13 for driving motor M according to the output of motor driving controller 7. Load detector 14 comprises a load change detector 11 for detecting the load applied to the motor M from the signal output from motor driving controller 7 to motor driver 13, thereby obtaining and outputting the average value K. The load detector 14 further comprises a load change determiner 12 for recognizing the magnitude of the average value output from load change detector 11 as a large value or a small value and outputting the gain value for the detected load to speed gain controller 5, phase gain controller 6, and motor driving controller 7. Motor driver 13 comprises a lowpass filter (LPF) 8 for converting the PWM signal output from motor driving controller 7 into a DC signal, a DC/DC converter 9 for converting the signal output from LPF 8 into an actual motor driving power supply ($V_s$), and a driver 10 for driving motor M in a playback mode by the signal output from the DC/DC converter 9, receiving a stand-by signal, i.e., the motor-on signal (ON), receiving forward/reverse determination signal (F/R) and driving motor M in a still picture mode. Generally, speed and phase gain controllers 5 and 6, motor driving controller 7, and motor driver 13 act as a motor regulator for driving the motor.

The operation and effect of the motor speed and phase controller according to the present invention having the aforementioned configuration will now be described.

In the case of playback operation, the speed and phase are detected by speed detector 1 and phase detector 2, respectively, to control motor M to reach a target speed and a target phase for the playback mode. The detected speed and phase are compared with the target speed and target phase in speed servo 3 and phase servo 4 to output an error signal corresponding to the difference between the detected value and the target value.

The output error signal is processed in accordance with a gain control value corresponding to the load output from load change determiner 12 by speed gain controller 5 and phase gain controller 6. Then, the error signal is added to the processed speed and phase signal to be input to motor driving controller 7.

Next, motor driving controller 7 gain-controls the signal to be suitable for the playback mode once again to output a final control signal, i.e., the PWM signal. In other words, motor driving controller 7 modulates the pulse-width as shown in FIG. 4 to control the speed of motor M, in which the frequency of the pulse is made to be constant and the on-time period is changed.

The PWM signal output from motor driving controller 7 is converted into a DC signal in LPF 8 and is converted into an actual motor driving power supply in DC/DC converter 9 to be applied to driver 10, thereby controlling motor M. At this time, load change detector 11 detects the load applied to motor M from motor driving controller 7 and then transmits the detected value to load change determiner 12. Load change determiner 12 calculates the load currently applied to motor M and outputs a determination value for the load to speed and phase gain controllers 5 and 6, thereby controlling the open-loop gain depending on the gain.

Here, the operation of load change detector 11 and load change determiner 12 will be described in detail.

Figure 4:
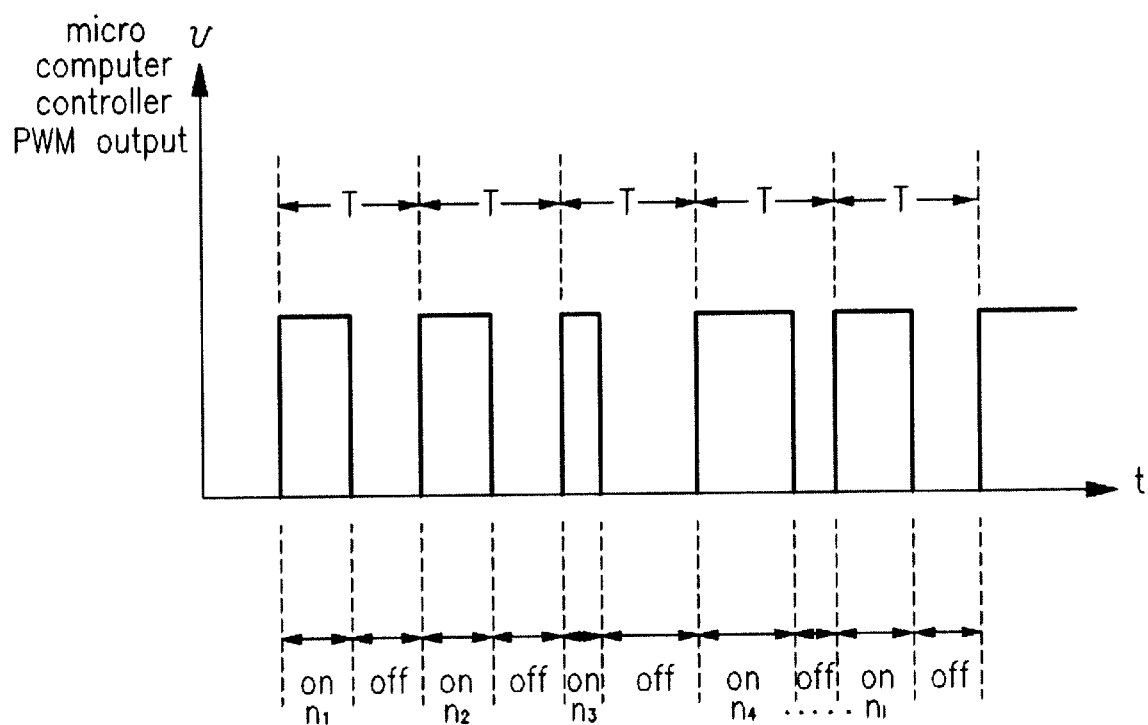
FIG. 4 is a timing chart of the load detection process during a playback mode according to an embodiment of the present invention.

As shown in FIG. 4, the PWM signal output from motor driving controller 7 is controlled with a constant period (T), but the on-time period changes as the load applied to motor M changes. Specifically, the larger the load, the bigger the on-time period, and vice versa.

At this time, the motor controlling PWM signal has a high frequency and the actual motor control has a low frequency. Furthermore, measuring the load change of motor too often to control the open loop gain may adversely effect the actual servo loop. Therefore, the load change is measured for a constant time to then calculate the average value.

Consequently, load change detector 11 calculates the load change value as the average load value K expressed as follows:

$$\overline{K} = \frac{\sum_{K=1}^{i} ni}{i} \quad (1)$$

where ni represents the on-time width.

Figure 5:
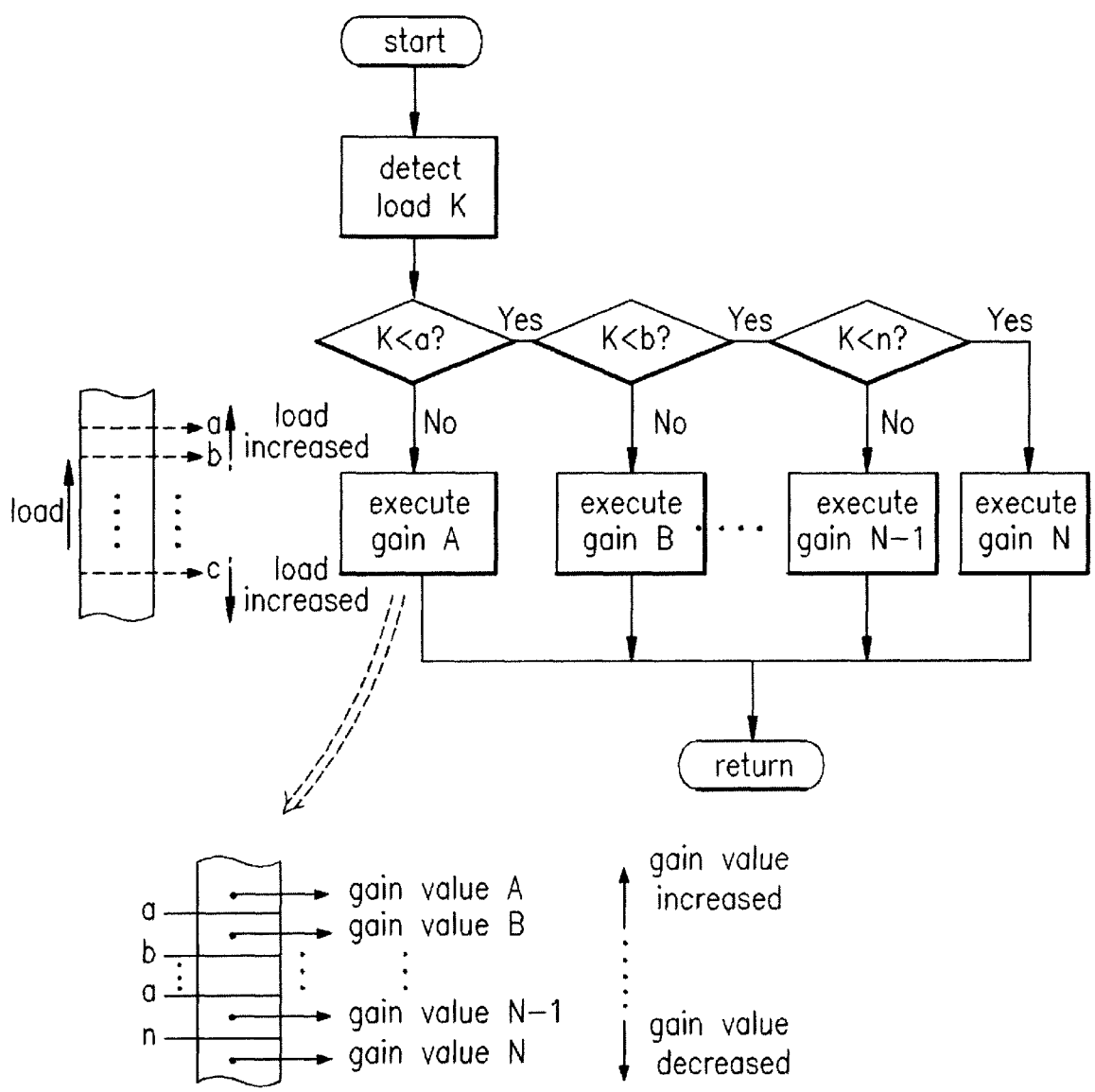
FIG. 5 is an operational flowchart of the motor speed and phase controller according to the present invention during a playback mode.

Load change determiner 12 operates as shown in FIG. 5. The magnitude determining reference values (a, b, . . . , n−1, n), obtained by dividing the load change value K detected in load change detector 11 and the load of a constant block, are compared and the range of the currently input load changes value K is obtained. Then, the determination values (A, B, . . . , N−1, N) corresponding to the obtained value is output to speed and phase gain controllers 5 and 6, thereby controlling the gain during the playback mode of motor.

Here, a>b>. . . >n−1>n and A>B>. . . >N−1>N.

Therefore, the load of the motor currently being controlled is measured in load change detector 11 and load change determiner 12. If the load is large, the open loop gain is made small, thereby increasing the resistance against the disturbance. On the contrary, if the load is small, the gain margin is large, which decreases the resistance against the disturbance, thereby optimizing the servo to the surrounding conditions when controlling the motor.

In the case of a still picture implementation, if a picture is input during the playback mode, the speed and phase are detected by speed detector 1 and phase detector 2, respectively to control motor M driven by the current playback mode to be suitable for the still picture mode to reach a target speed and a target phase. The detected speed and phase are compared with the target speed and target phase in speed servo 3 and phase servo 4 to output error signal corresponding to the difference between the detected value and the target value.

The output error signal is processed by a gain control value set by speed gain controller 5 and phase gain controller 6 which is combined with the speed and phase signal to then be input to motor driving controller 7.

Next, motor driving controller 7 recognizes the input still picture signal and then gain-controls the added speed and phase signals for the still picture mode, to output a final control signal, i.e, the PWM signal. Also, the driving signal corresponding to motor M is supplied via the control system, i.e, LPF 8 to DC/DC converter 9 to driver 10 in series, which depends on the PWM signal, thereby controlling motor M at a desired speed.

At this time, load change detector 11 of load detector 14 detects the load applied to motor M based on the PWM signal output from motor driving controller 7 and outputs the detected load to load change determiner 12. Load change determiner 12 calculates the average value K of the load output from load change detector 11 and then the average value K is compared with the magnitude determining reference value of the load. The corresponding determination value is output to motor driving controller 7. Here, the control signal is a feedback signal for applying a brake to motor M so as to remove the phase difference between video head VH and video track at the still picture implementing time.

Then, motor driving controller 7 outputs a motor standby signal, i.e., the motor-on signal and the forward and reverse rotation determination signal (F/R) to driver 10, thereby controlling motor M in a still picture mode.

The operation of load change detector 11 and load change determiner 12, which are aspects of the preferred embodiment of the present invention, will now be described in more detail.

Figure 6:
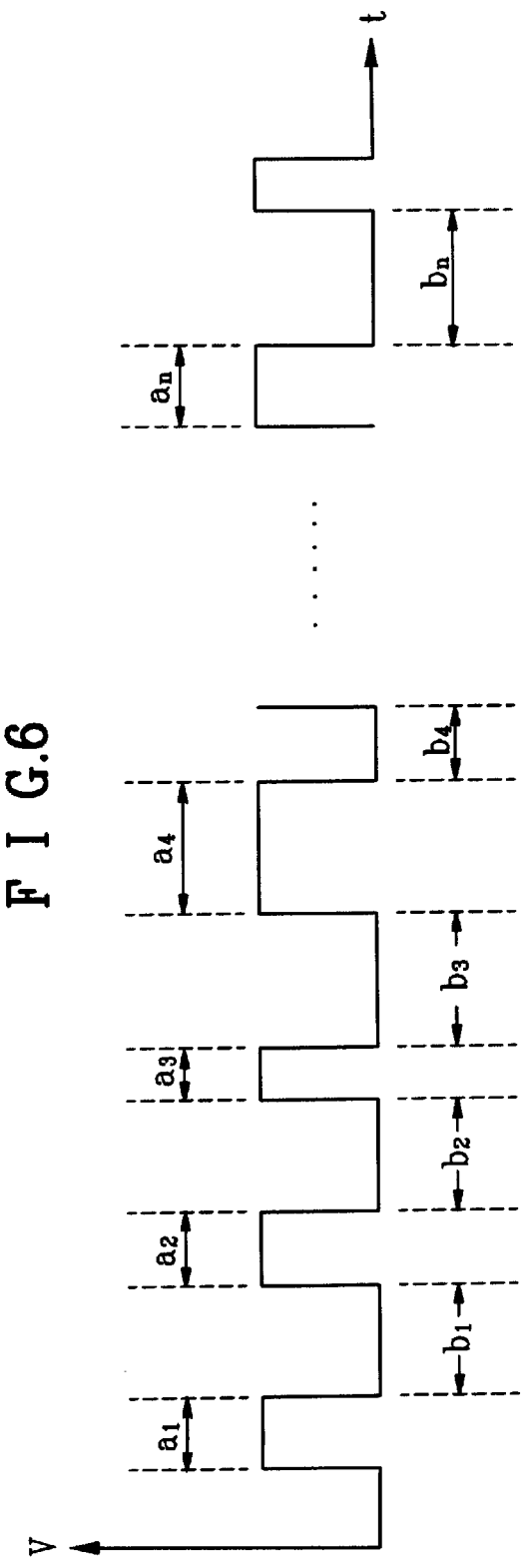
FIG. 6 is a timing chart of the load detection process during a still picture mode according to the present invention.

Load change detector 11 detects the load based on the PWM signal output from motor driving controller 7, as shown in FIG. 6.

In other words, if the load of motor M is large, the on-time period $(a_1, a_2, \ldots, a_n)$ of the PWM signal is long, i.e, the duty ratio is large. On the contrary, if the load of motor M is small, the on-time period $(a_1, a_2, \ldots a_n)$ of the PWM signal is short, i.e, the duty ratio is small.

At this time, in order to detect the load more exactly, the on-time periods $(a_1, a_2, \ldots a_n)$ of the PWM signal are added together and divided by total period (n).

Figure 7:
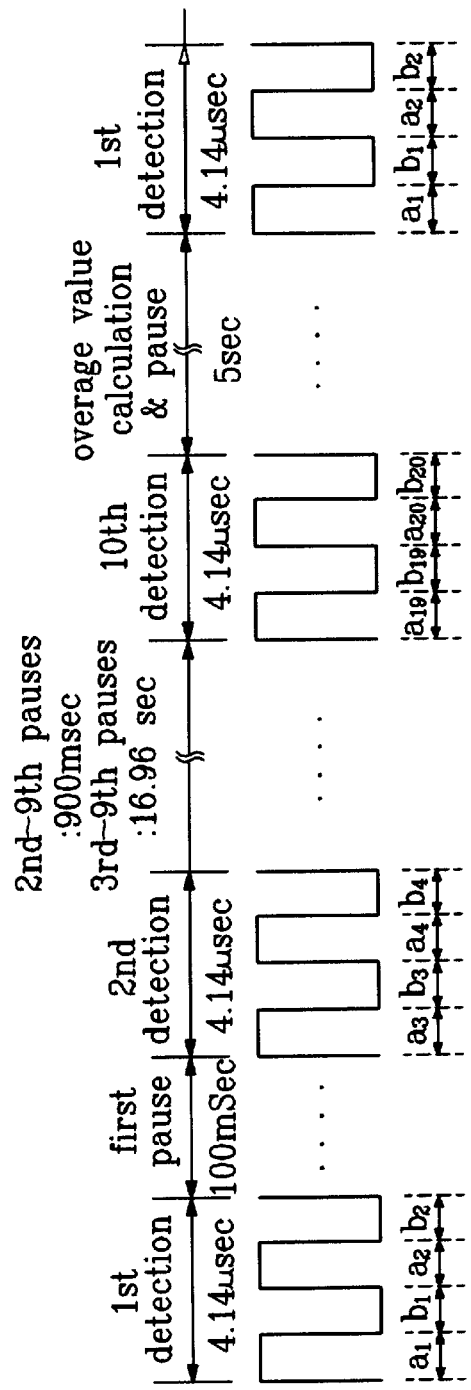
FIG. 7 is a timing chart illustrating the average value calculation for the load during a still picture mode according to the present invention.

For example, as shown in FIG. 7, if the frequency of the PWM signal supplied to motor M is 47 KHz, one period of this signal is 2.14 μsec. The on-time periods of modulated control signal of total pulses are detected in the method that two on-time periods $(a_1, a_2, \ldots, a_n)$ of the PWM signal are detected ten times for every 100 seconds, and the average value K for 5 seconds is obtained by modifying the relationship (1) as follows:

$$\overline{K} = \frac{\sum_{K=1}^{20} ni}{20} \quad (2)$$

Also, as shown in FIG. 8, as the method of detecting the phase of motor M during playback mode, in order to increase the detection sensitivity of the phase difference between tracks while the video head VH traces tracks of tape, the detected values are accumulated four times and the average value (A) thereof is calculated.

Figure 10:
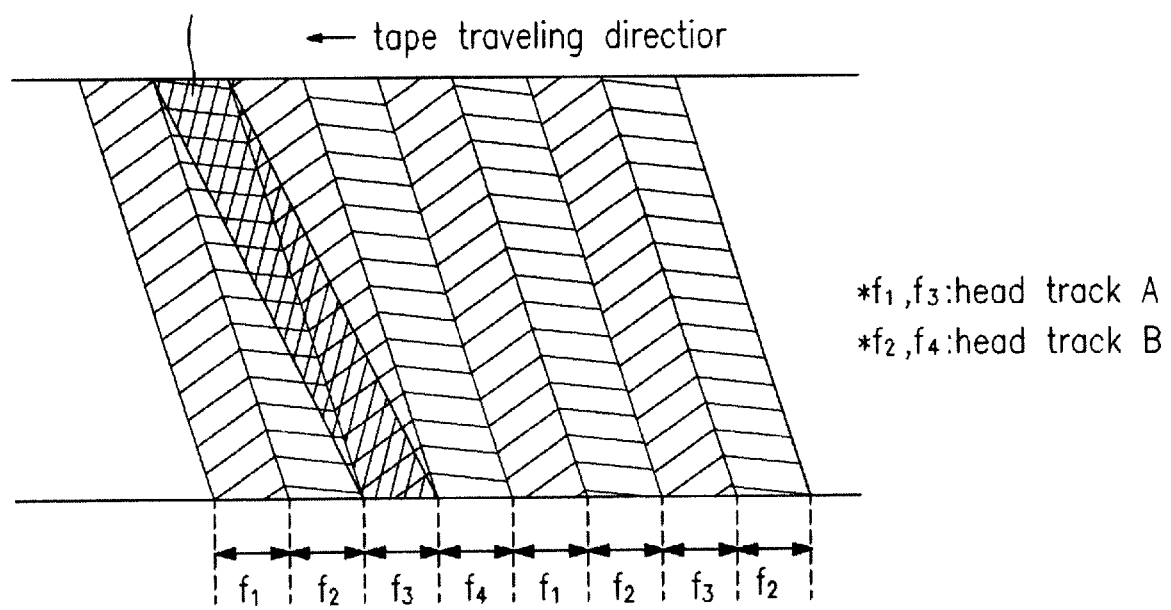
FIG. 10 is a timing chart illustrating the video head tracing tracks according to the present invention.

During the still action of the average values "K" and "A", as shown in FIG. 9, since the brake period $t_2$ of motor M is determined by the average value K and the stop control time $t_1$ of motor M is determined by the average value A, motor M is stopped at exactly the desired time. Therefore, as shown in FIG. 10, since video head VH traces the video tracks exactly, a more precise still-picture can be supplied.

In FIG. 9, if the average value A is increased, video head VH leads tracks, thereby shortening the stop control time $t_1$ of motor M. If the average value A is decreased, video head VH lags tracks, thereby lengthening the stop control time $t_1$ of motor M. Thus, the phase is compensated for during still picture mode.

Also, if the average value K is large, which means that the load of motor M is large, the brake period $t_2$ is shortened. If the average value K is small, which means that the load of motor M is small, the brake period $t_2$ is lengthened. Thus, the deviation of motor stop points depending on the load applied to motor M can be compensated.

Figure 11:
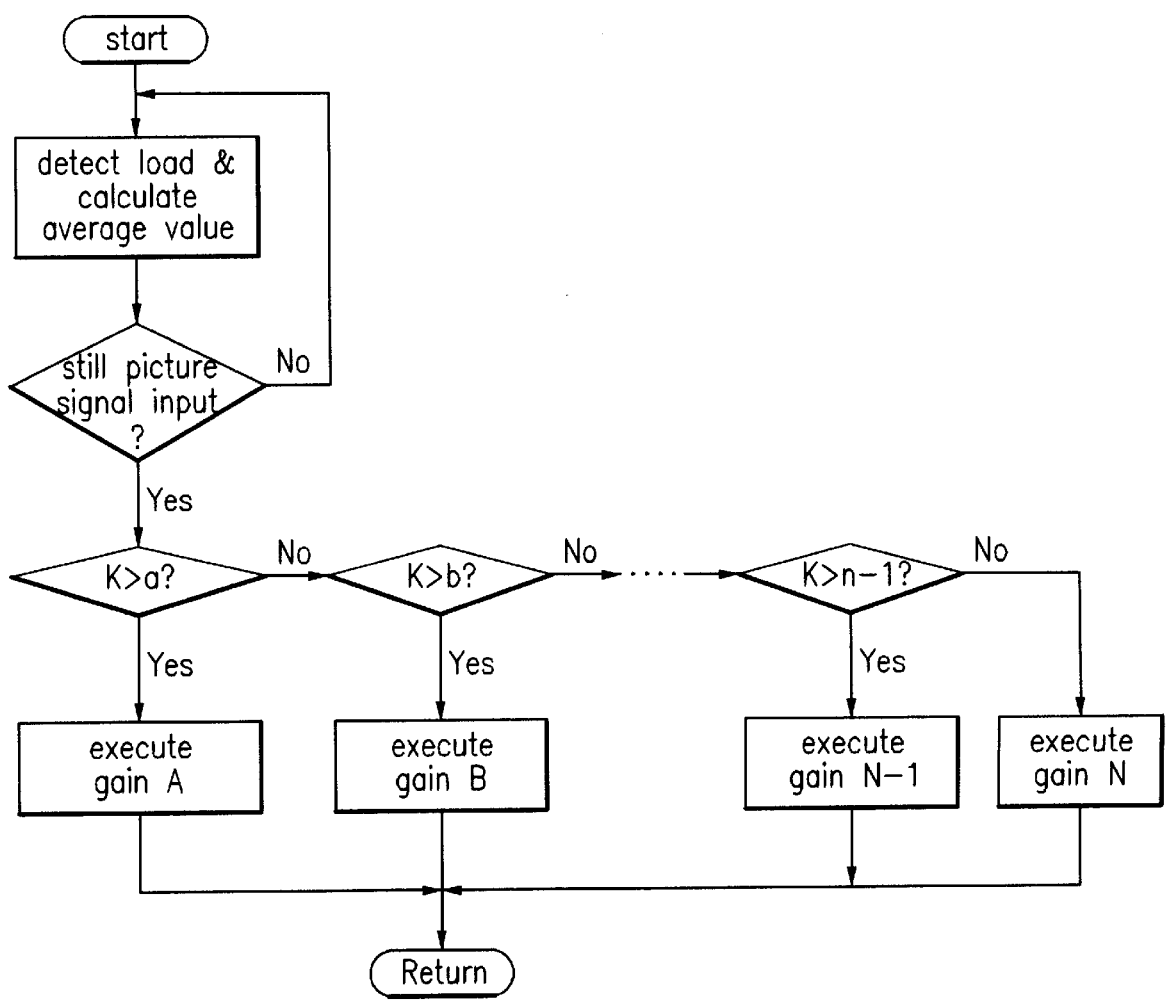
FIG. 11 is an operational flowchart of the motor speed and phase controller according to the present invention during a still picture mode.

Load change determiner 12 operates as shown in FIG. 11. The load of motor M is detected by load change detector 11 during playback mode in a similar process as shown in FIG. 5 and the average value K of the detected loads is calculated. If a still picture signal is input, the average value K is compared with the load magnitude determining references values (a, b, ..., n−1, n) to calculate the range of currently input load change value K.

Then, the determination values (A, B, ..., N−1, N) corresponding to the calculated value are output to motor driving controller 7, thereby controlling the gain of motor M during still picture mode.

Here, a>b>...>n−1>n and A>B>...>N−1>N.

Therefore, to describe FIG. 9 in greater detail, motor driving controller 7 receives the phase detection value and average value of loads of motor M, fed back via a predetermined path during playback mode, to determine the stop control time $t_1$ and brake period $t_2$. Then, based on a head switching signal (HS) shown in FIG. 9a, a motor-on signal (ON) shown in FIG. 9b, a forward/reverse rotation direction determining signal (F/R) shown in FIG. 9c, and a motor driving signal (VS) shown in FIG. 9d are generated according to the stop control time $t_1$ and the brake period $t_2$, thereby attaining a precise still picture.

Figure 12:
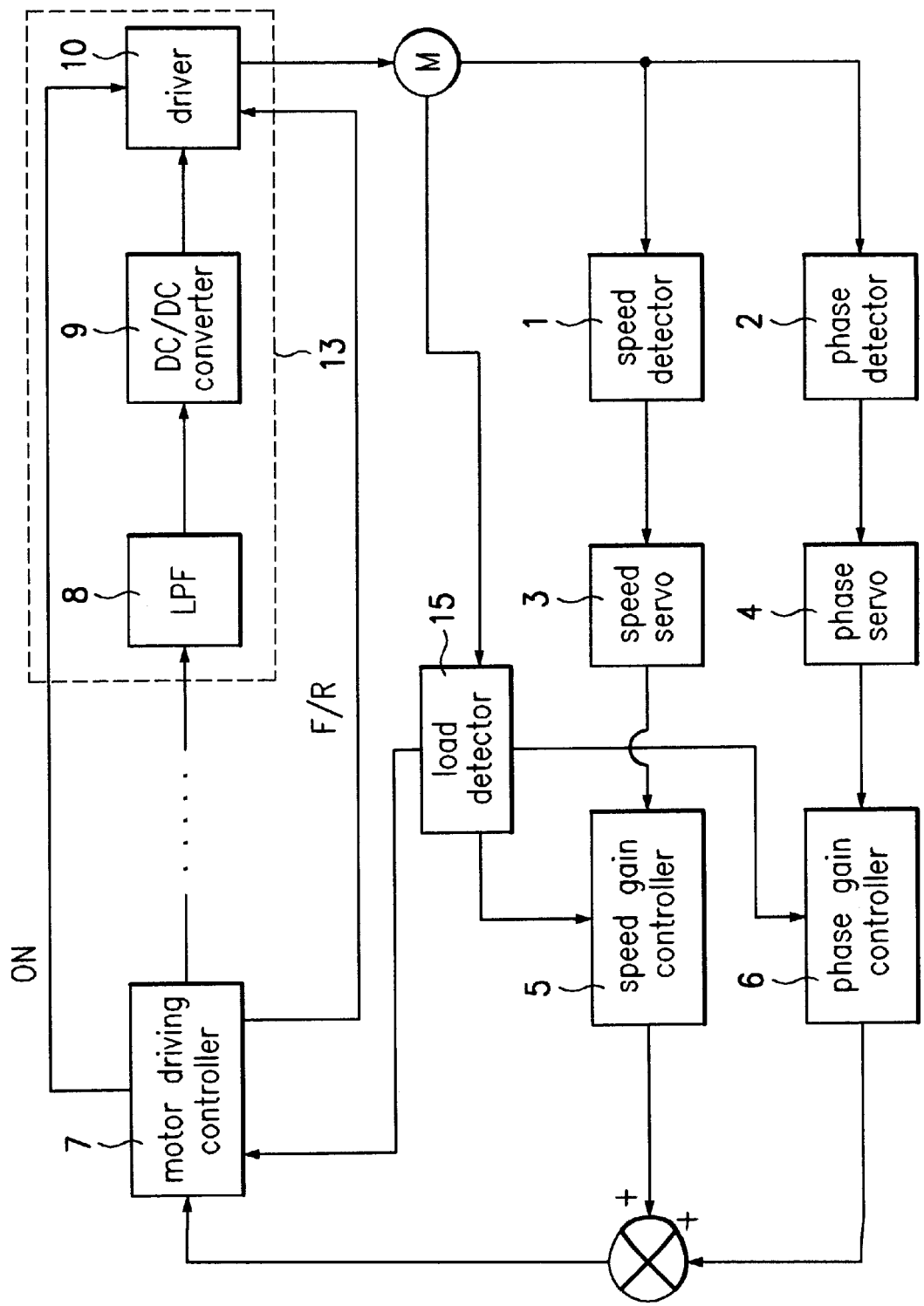
FIG. 12 is a block diagram of a motor speed and phase controller according to another embodiment of the present invention.
Figure 13:
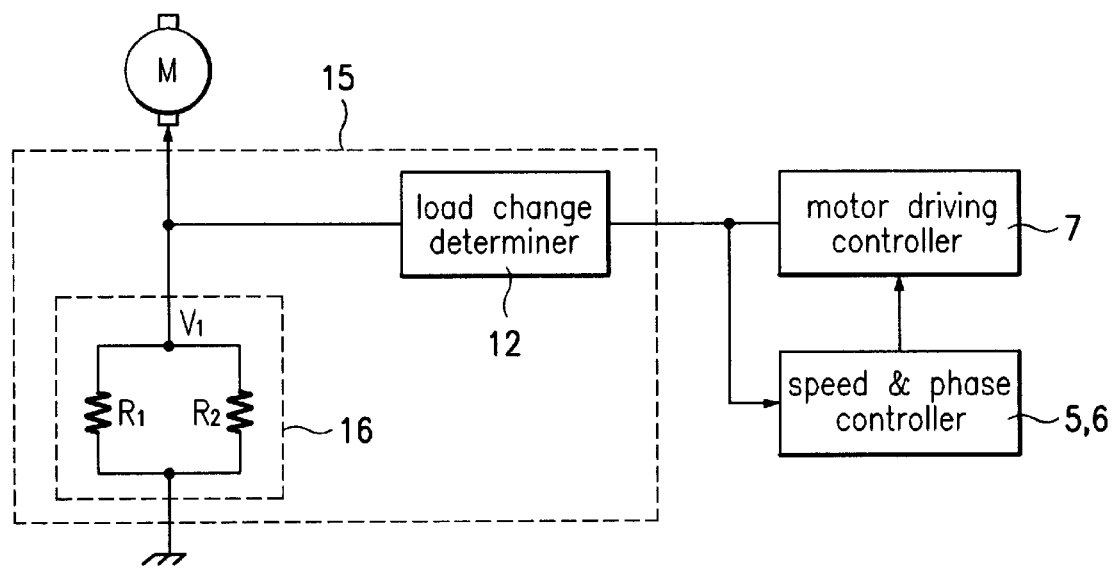
FIG. 13 is a circuit diagram of the load detector shown in FIG. 12 according to another embodiment of the present invention.

FIG. 12 is a schematic block diagram of a motor speed and phase controller according to another embodiment of the present invention. In FIG. 13, a load detector 15 includes a load change detector 16 and a load change determiner 12, in which the output current $i_1$ of motor M flows toward ground via resistances $R_1$ and $R_2$ connected in parallel. Thus, the voltage $V_1$ of a point between motor M and resistances $R_1$ and $R_2$ becomes equal to $i_1R_1R_2/(R_1+R_2)$, which is used by load change determiner 12 to calculate the average value K of the loads. Then, the average value K is compared with the magnitude determining reference values of the loads and the corresponding determination value is output to motor driving controller 7.

Motor driving controller 7 outputs a control signal shown in FIG. 9 according to the output determination value so that a still action (a still picture mode) is taken to motor M.

In the case of a playback implementation, the load applied to motor M is detected by the load change detector 16 with the voltage $V_1 [i_1R_1R_2/(R_1+R_2)]$ of an output from motor M, which is used to calculate the average load value K. The average value K is compared with the magnitude determining reference values of the loads. The corresponding determination value is output to speed and phase gain controllers 5 and 6 to allow an open loop gain control, and is processed into the gain control signal corresponding to the load output from load detector 15 by speed and phase gain controllers 5 and 6 to then be input to motor driving controller 7, thereby optimizing a servo control which is sensitive to the surrounding conditions.

The motor speed and phase controller according to the present invention adapted to a capstan motor for a 8 mm VCR will now be described.

Figure 14:
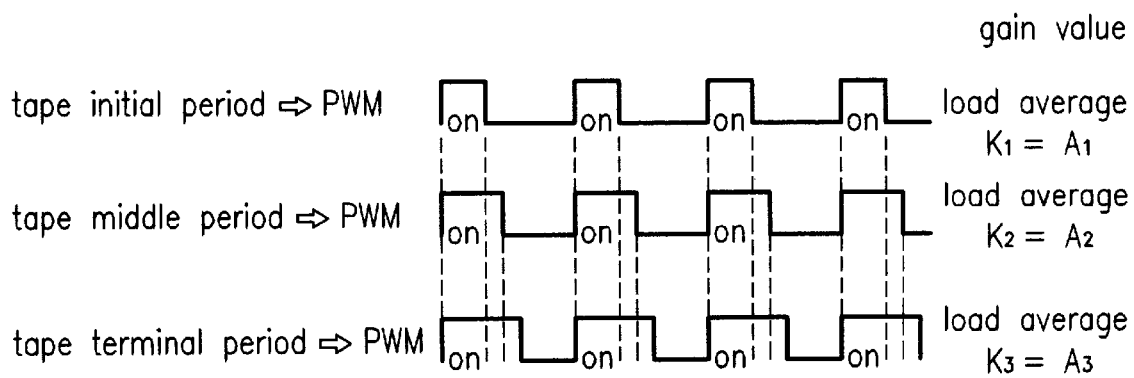
FIG. 14 is a plot illustrating the operation for the adoption of the present invention.
Figure 14:
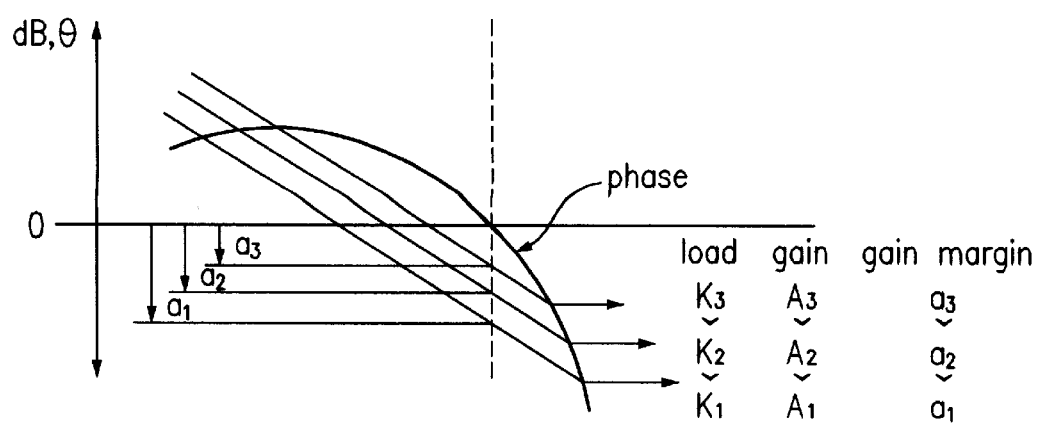

FIG. 14 illustrates the operation of the motor speed and phase controller adopted to VCR capstan motor according to a first embodiment of the present invention. For example, the load values for the tape initial, middle, and terminal periods are conventionally in sequence such that initial load<middle load<terminal load. Thus, in view of the PWM signal, the detected loads satisfy the condition $K_1<K_2<K_3$.

At this time, if the load $K_1$ is small, small disturbance components are applied to the motor. If the load $K_3$ is large, large disturbance components are applied to the motor. Small disturbance components like the load $K_1$ are controlled by the determination value $A_1$ to secure the open loop gain margin of $a_1$. Large disturbance components like the load $K_3$ are controlled by the determination value $A_3$ to secure the open loop gain margin of $a_3$. In this manner, depending on the load conditions during playback mode and still picture mode, the resistance against the disturbance is adjusted.

If the feedback loop is formed as described above, the open loop gain can be secured by the load conditions according to temperature change, tape difference according to time, tape travelling load difference according to the mechanism, thereby allowing an optimum servo.

As described above, according to the motor speed and phase controller of the present invention, since the loop gain margin corresponding to the observed load conditions of motor is controlled, the optimum servo fully considers the surrounding conditions.

Particularly, during playback mode and still picture mode, in which the load change is greatly influenced by the surrounding factors, the controlling of the loop gain margin of the motor solves the difficulty of securing the architecture margin and improves performance. Also, a high-definition picture screen is attained even in a bad surrounding conditions.

It will be apparent to those skilled in the art that various modifications and variations can be made in the speed and phase controller for a motor of the present invention without departing from the spirit or scope of the invention. Thus, it is intended that the present invention cover the modifications and variations of this invention provided they come within the scope of the appended claims and their equivalents.

What is claimed is:

1. An apparatus for controlling speed and phase of a motor, comprising:
    a speed and phase detector for respectively detecting the speed and the phase of the rotating motor;
    a load change detector for detecting the load applied to the motor by adding on-time periods of the motor driving control signal for predetermined periods and calculating an average on-time period to determine a load change value for said period;
    a load change determiner for recognizing the magnitude of the load change value outputted from the load change detector and outputting a determination gain value for the detected load changes;
    a speed phase gain controller for processing the control signal outputting from the speed and phase servo using the determination gain value outputting from the load change determiner;
    a motor driving controller for outputting a driving control signal according to the processed speed and phase control signal; and
    a motor driver for driving the motor at a substantially constant speed and phase according to the output of the motor driving controller.

2. The apparatus for controlling speed and phase of a motor according to claim 1, a load change detector for detecting a load change of the motor from the driving control signal from the motor driving controller to the motor driver.

3. The apparatus for controlling speed and phase of a motor according to claim 1, a load change detector for detecting a voltage output from a port of the motor.

4. The apparatus for controlling speed and phase of a motor according to claim 1, wherein the load change detector includes a pair of resistors in parallel connected to ground.

5. The apparatus for controlling speed and phase of a motor according to claim 1, wherein the driving control signal of the motor driving controller is a pulse-width modulated signal.

6. The apparatus for controlling speed and phase of a motor according to claim 1, wherein the motor driver includes:
    a low pass filter for converting the pulse-width modulated signal of the motor driving controlling means into a DC signal;
    a DC/DC converter for converting the DC signal of the low pass filter into a motor driving power supply; and
    a driver for driving the motor according to the motor driving power supply, a motor-on signal, and a forward/reverse determination signal.

7. A video cassette recorder, comprising:
a motor; and
a speed and phase controller including:
    a speed and phase detector for respectively detecting the speed and the phase of the rotating motor;
    a speed and phase servo for respectively comparing the speed and the phase detected by the speed and phase detector and outputting a speed and phase control signal corresponding to the difference between the detected values and the target values;
    a load change detector for detecting the load applied to the motor by adding on-time periods of the motor driving control signal for predetermined periods and calculating an average on-time period to determine a load change value for said period;
    a load change determiner for recognizing the magnitude of the load change value outputting from the load change detector and outputting a determination gain value for the detected load changes; and
    a motor regulator for driving the motor at a substantially constant speed and phase according to the determination value and the speed/phase control signal.

8. The video cassette recorder according to claim 7, wherein the motor regulator contains:
    a gain controller for amplifying the speed/phase control of the detector and servo;
    a motor driving controller for outputting a driving control signal according to the amplified speed/phase control signal; and
    a motor driver for driving the motor according to the drive control signal of the motor driving controller.

9. The video cassette recorder according to claim 8, wherein the gain controller variable-amplifies the speed/phase control signal according to the determination value of the load detector.

10. The video cassette recorder according to claim 8 wherein the motor driving controller variable-outputs the driving control signal according to the determination value of the load detector.

11. The video cassette recorder according to claim 8, wherein the driving control signal of the motor driving controller is a pulse-width modulated signal.

12. The video cassette recorder according to claim 8, wherein the motor driver has:
    a low pass filter for converting the pulse-width modulated signal of the motor driving controlling means into a DC signal;
    a DC/DC converter for converting the DC signal of the low pass filter into a motor driving power supply; and
    a driver for driving the motor according to the motor driving power supply, a motor-on signal, and a forward/reverse determination signal.

13. The video cassette recorder according to claim 7, wherein the load change detector for detecting a load change of the motor from the motor regulator.

14. The video cassette recorder according to claim 7, wherein the load change detector for detecting a voltage output from a port of the motor corresponding to a load on the motor.

* * * * *